(12) United States Patent
Scivicque et al.

(10) Patent No.: US 11,381,685 B2
(45) Date of Patent: *Jul. 5, 2022

(54) METHOD AND SYSTEM FOR MANAGING ROUTING ACROSS MULTIPLE NETWORKS WITH SEPARATE ROUTING MASTERS

(71) Applicant: Level 3 Communications, LLC, Broomfield, CO (US)

(72) Inventors: Joseph A. Scivicque, Lafayette, LA (US); Adam Uzelac, Rochester, NY (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/128,819

(22) Filed: Dec. 21, 2020

(65) Prior Publication Data

US 2021/0112165 A1    Apr. 15, 2021

Related U.S. Application Data

(63) Continuation of application No. 16/425,714, filed on May 29, 2019, now Pat. No. 10,880,439.

(60) Provisional application No. 62/794,776, filed on Jan. 21, 2019.

(51) Int. Cl.
| | |
|---|---|
| *H04L 45/12* | (2022.01) |
| *H04M 7/00* | (2006.01) |
| *H04L 45/302* | (2022.01) |
| *H04M 7/12* | (2006.01) |

(52) U.S. Cl.
CPC .......... *H04M 7/0081* (2013.01); *H04L 45/12* (2013.01); *H04L 45/302* (2013.01); *H04M 7/009* (2013.01); *H04M 7/0075* (2013.01); *H04M 7/12* (2013.01)

(58) Field of Classification Search
CPC .. H04M 7/0081; H04M 7/0075; H04M 7/009; H04M 7/12; H04M 2203/156; H04L 45/12; H04L 45/302
See application file for complete search history.

(56) References Cited

U.S. PATENT DOCUMENTS

| | | | |
|---|---|---|---|
| 7,899,177 B1 | 3/2011 | Bruening | |
| 2001/0013066 A1 | 8/2001 | Erb | |
| 2005/0076316 A1 * | 4/2005 | Pierrat | .................. G06F 30/398 716/52 |
| 2012/0321058 A1 * | 12/2012 | Eng | ..................... H04L 65/1069 379/90.01 |

(Continued)

*Primary Examiner* — Lan-Huong Truong

(57) ABSTRACT

Novel tools and techniques are provided for implementing management of routing across multiple voice or data networks with separate routing masters. In various embodiments, in response to receiving a request to establish a call between a calling party in a first network and a called party in a second network, a computing system might receive a first set of network information from a first routing database(s) that is operated by a first service provider and a second set of network information from a second routing database(s) that is operated by a second service provider separate from the first service provider; might analyze the received first and second sets of network information to generate a unified routing model for optimizing routing of the call through the first and second networks; and might establish the call through a selected optimized route based on the generated unified routing model.

18 Claims, 8 Drawing Sheets

(56) References Cited

U.S. PATENT DOCUMENTS

| | | |
|---|---|---|
| 2014/0269496 A1* | 9/2014 | Mufti .................... H04L 65/103 370/328 |
| 2015/0189087 A1 | 7/2015 | Ma |
| 2019/0173750 A1 | 6/2019 | Shaikh |
| 2020/0236221 A1 | 7/2020 | Scivicque |

* cited by examiner

METHOD AND SYSTEM FOR MANAGING ROUTING ACROSS MULTIPLE NETWORKS WITH SEPARATE ROUTING MASTERS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing call or data routing, and, more particularly, to methods, systems, and apparatuses for implementing management of routing across multiple voice or data networks with separate routing masters.

BACKGROUND

Traditionally, voice networks (or data networks) associated with or operated by different service providers might utilize different network routing protocols and/or routing models. As a result, for voice calls (or for data transmission) across such different networks associated with or operated by different service providers, inefficient call connections (or inefficient data transfer) may result.

Hence, there is a need for more robust and scalable solutions for implementing call or data routing, and, more particularly, to methods, systems, and apparatuses for implementing management of routing across multiple voice or data networks with separate routing masters.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
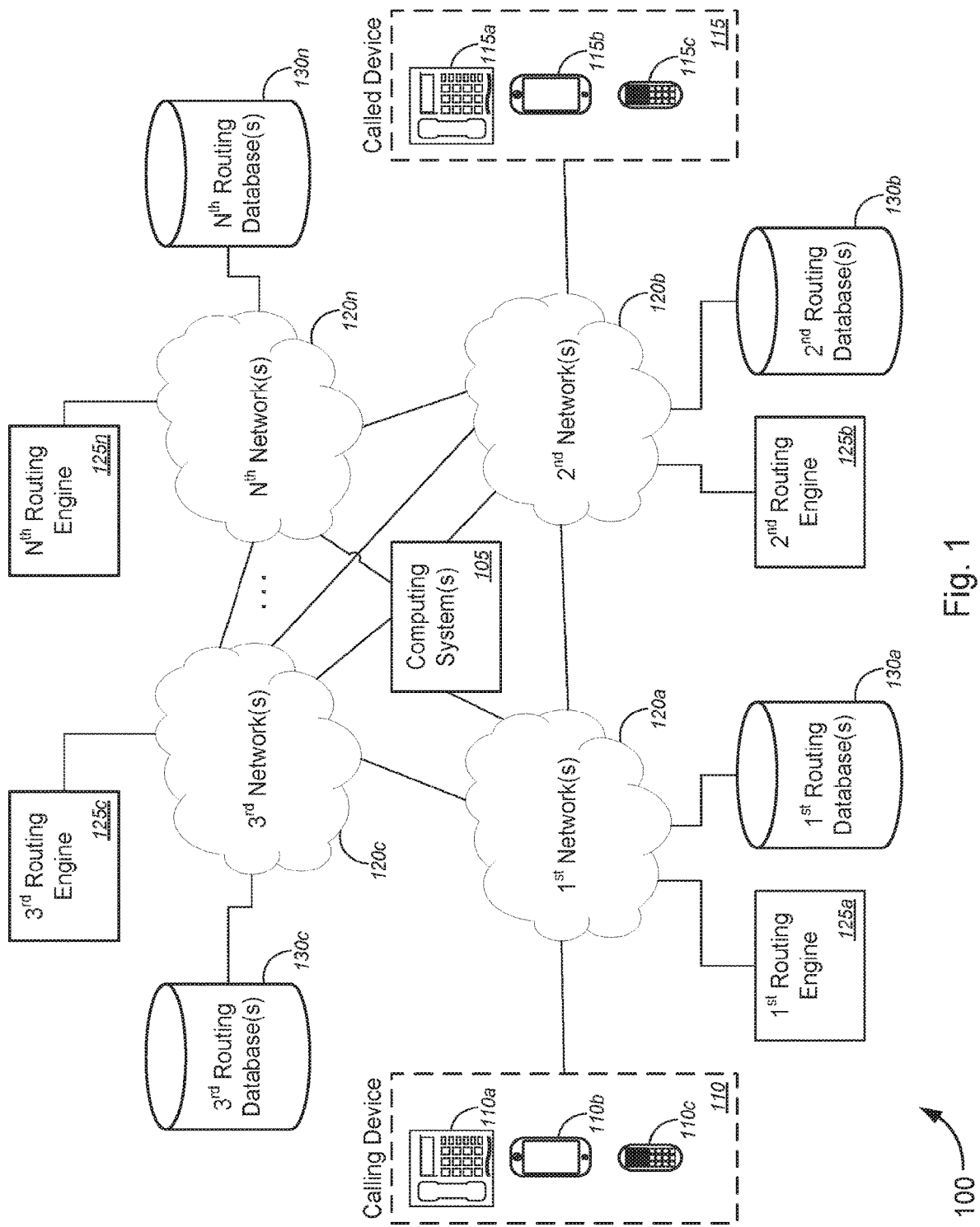
FIG. 1 is a schematic diagram illustrating a system for implementing management of routing of a call across multiple voice networks with separate routing masters, in accordance with various embodiments.

Various embodiments provide tools and techniques for implementing call or data routing, and, more particularly, to methods, systems, and apparatuses for implementing management of routing across multiple voice or data networks with separate routing masters.

In various embodiments, a computing system might receive, from a first user at an originating point (via a first user device(s), or the like) in at least one first network, either a request to establish a call between a calling party (e.g., the first user) and a called party (e.g., a second user) at a destination point (via a second user device(s), or the like) in at least one second network or a request to establish a connection between the first user and the second user at the destination point (via the second user device(s), or the like) in the at least one second network to facilitate transmission and reception of data between the first user device(s) and the second user device(s). The computing system might receive a first set of network information from one or more first routing databases associated with the at least one first network that is operated by a first service provider; might receive a second set of network information from one or more second routing databases associated with the at least one second network that is operated by a second service provider that is separate from the first service provider; (optionally) might receive one or more of a third set of network information from one or more third routing databases associated with at least one third network 220c operated by a third service provider that is separate from each of the first service provider and the second service provider through an $N^{th}$ set of network information from one or more $N^{th}$ routing databases associated with at least one $N^{th}$ network 220n operated by an $N^{th}$ service provider that is separate from each of the first service provider, the second service provider, and the third service provider.

The computing system might analyze the received network information (e.g., the received first set of network information, the received second set of network information, and (optionally or where applicable) one or more of the received third through $N^{th}$ set of network information, or the like) either to generate a unified routing model for optimizing routing of the call between the calling party and the called party through the at least one first network and the at least one second network (and, optionally or where applicable, one or more of the at least one third network through the at least one $N^{th}$ network) or to generate a unified routing model for optimizing routing of the data between the first user device and the second user device through the at least one first network and the at least one second network (and, optionally or where applicable, one or more of the at least one third network through the at least one $N^{th}$ network). The computing system might select an optimized route between the first user device and the second user device through the at least one first network and the at least one second network (and, optionally or where applicable, one or more of the at least one third network through the at least one $N^{th}$ network) for establishing the call based at least in part on the generated unified routing model or for establishing the connection, and/or facilitating routing of data, between the first user device and the second user device, based at least in part on the generated unified routing model; and might establish the call based at least in part on the selected optimized route or establish the connection, and/or facilitating routing of data, between the first user device and the second user device through the at least one first network and the at least one second network (and, optionally or where applicable, one or more of the at least one third network through the at least one $N^{th}$ network), based at least in part on the selected optimized route.

Merely by way of example, in some instances, the first through $N^{th}$ sets of network information might each include, but is not limited to, at least one of private peering agreements, private commercial exchange data, traffic exchange agreements, cost data for traffic exchange, service level agreements, minimum contractually required traffic, maximum contractually required traffic, local exchange routing guide ("LERG") data, number portability, user identification portability, key performance indicator ("KPI") data, data regarding health of network routes, capacity of network routes, quality of service ("QoS"), industry data, service level agreements ("SLA"), connectivity details, usage data, call detail records, call statistics, data transmission logs, network connectivity statistics, network configuration data, or other attributes from each network, and/or the like.

In some embodiments, the computing system might apply weighting factors to predetermined categories of data among each of the first set of network information and the second set of network information (and, optionally or where applicable, one or more of the at least one third through $N^{th}$ sets of network information, or the like). In such cases, generating the unified routing model for optimizing routing of the data between the first user device and the second user device through the at least one first network and the at least one second network (and, optionally or where applicable, the one or more of the at least one third network through the at least one $N^{th}$ network) might comprise generating the unified routing model for optimizing routing of the data between the first user device and the second user device through the at least one first network and the at least one second network (and, optionally or where applicable, the one or more of the at least one third network through the at least one $N^{th}$ network) based at least in part on the applied weighting factors to the predetermined categories of data among each of the first set of network information and the second set of network information (and, optionally or where applicable, the one or more of the at least one third through $N^{th}$ sets of network information, or the like). In some instances, the weighting factors might be based on at least one of KPI data, data regarding health of network routes, capacity of network routes, QoS, industry data, SLA, or private commercial exchange data, and/or the like.

According to some embodiments, the computing system might normalize routing data to fit each subnetwork within each of the at least one first network and the at least one second network (and, optionally or where applicable, the one or more of the at least one third network through the at least one $N^{th}$ network), and might datafill each routing engine in each corresponding subnetwork within each of the at least one first network and the at least one second network (and, optionally or where applicable, the one or more of the at least one third network through the at least one $N^{th}$ network) with the normalized routing data. In such cases, establishing the call or establishing the connection, and/or facilitating routing of data, between the first user device and the second user device through the at least one first network and the at least one second network (and, optionally or where applicable, one or more of the at least one third network through the at least one $N^{th}$ network) based on the selected optimized route might comprise sending, with the computing system, routing instructions to each routing engine to route the call or to route the data based on the normalized routing data.

In some embodiments, selecting the optimized route through the at least one first network and the at least one second network (and, optionally or where applicable, the one or more of the at least one third network through the at least one $N^{th}$ network) might comprise identifying, with the computing system, one or more direct routes through each of the at least one first network and the at least one second network (and, optionally or where applicable, the one or more of the at least one third network through the at least one $N^{th}$ network) between the originating point and the destination point; identifying, with the computing system, one or more indirect routes through each of the at least one first network and the at least one second network (and, optionally or where applicable, the one or more of the at least one third network through the at least one $N^{th}$ network) between the originating point and the destination point; identifying, with the computing system, one or more customers connected to each of the at least one first network and the at least one second network (and, optionally or where applicable, the one or more of the at least one third network through the at least one $N^{th}$ network); analyzing, with the computing system, at least one of the identified one or more direct routes, the identified one or more indirect routes, or the identified one or more customers; and selecting, with the computing system, an optimized route through the at least one first network and the at least one second network (and, optionally or where applicable, the one or more of the at least one third network through the at least one $N^{th}$ network) for establishing the call or for establishing the connection, and/or facilitating routing of data, between the first user device and the second user device based at least in part on the generated unified routing model and based at least in part on the analysis of the at least one of the identified one or more direct routes, the identified one or more indirect routes, or the identified one or more customers.

These and other aspects of the management of routing of voice or data across multiple voice or data networks with separate routing masters are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, call routing technology, call routing management technology, data routing technology, data routing management technology, network management technology, and/or the like. In other aspects, certain embodiments, can improve the functioning of user equipment or systems themselves (e.g., call routing systems, call routing management systems, data routing systems, data routing management systems, network management systems, etc.), for example, by receiving, with a computing system from a calling party at an originating point in at least one first network, a request to establish a call between the calling party and a called party at a destination point in at least one second network; receiving, with the computing system, a first set of network information from one or more first routing databases associated with the at least one first network that is operated by a first service provider; receiving, with the computing system, a second set of network information from one or more second routing databases associated with the at least one second network that is operated by a second service provider that is separate from the first service provider; analyzing, with the computing system, the received first set of network information and the received second set of network information to generate a unified routing model for optimizing routing of the call between the calling party and the called party through the at least one first network and the at least one second network; selecting, with the computing system, an optimized route through the at least one first network and the at least one second network for establishing the call based at least in part on the generated unified routing model; and establishing, with the computing system, the call based at least in part on the selected optimized route; and/or the like.

In particular, to the extent any abstract concepts are present in the various embodiments, those concepts can be implemented as described herein by devices, software, systems, and methods that involve specific novel functionality (e.g., steps or operations), such as, analyzing, with the computing system, the received first set of network information and the received second set of network information to generate a unified routing model for optimizing routing of the call between the calling party and the called party through the at least one first network and the at least one second network; selecting, with the computing system, an optimized route through the at least one first network and the at least one second network for establishing the call based at least in part on the generated unified routing model; and establishing, with the computing system, the call based at least in part on the selected optimized route; and/or the like, which optimizes networks associated with different service providers to facilitate call routing across different networks, and/or the like, to name a few examples, that extend beyond mere conventional computer processing operations. In a similar manner, data routing may be improved and facilitated. These functionalities can produce tangible results outside of the implementing computer system, including, merely by way of example, optimized routing of calls or data across different networks associated with or operated by different service providers, and/or the like, at least some of which may be observed or measured by customers and/or service providers.

In an aspect, a method might comprise receiving, with a computing system from a calling party at an originating point in at least one first network, a request to establish a call between the calling party and a called party at a destination point in at least one second network; receiving, with the computing system, a first set of network information from one or more first routing databases associated with the at least one first network that is operated by a first service provider; and receiving, with the computing system, a second set of network information from one or more second routing databases associated with the at least one second network that is operated by a second service provider that is separate from the first service provider. The method might further comprise analyzing, with the computing system, the received first set of network information and the received second set of network information to generate a unified routing model for optimizing routing of the call between the calling party and the called party through the at least one first network and the at least one second network; selecting, with the computing system, an optimized route through the at least one first network and the at least one second network for establishing the call based at least in part on the generated unified routing model; and establishing, with the computing system, the call based at least in part on the selected optimized route.

In some embodiments, the computing system might comprise at least one of a call server, a call controller, a call manager, a media gateway controller, centralized call server, a centralized call controller, a centralized call manager, or a centralized media gateway controller, and/or the like. In some cases, the calling device associated with the calling party might comprise at least one of a telephone, a voice over Internet protocol ("VoIP") private branch exchange ("PBX"), a time-division multiplexing ("TDM") voice PBX, a VoIP soft client, a facsimile machine, or a voice origination device, and/or the like. In some instances, the at least one first network and the at least one second network might each comprise at least one of a circuit-switched network, a public switched telephone network, a voice over Internet protocol ("VoIP") network, a computer network, or the Internet, and/or the like.

According to some embodiments, the first set of network information and the second set of network information might each comprise at least one of private peering agreements, private commercial exchange data, traffic exchange agreements, cost data for traffic exchange, service level agreements, minimum contractually required traffic, maximum contractually required traffic, local exchange routing guide ("LERG") data, number portability, key performance indicator ("KPI") data, data regarding health of network routes, capacity of network routes, quality of service ("QoS"), industry data, service level agreements ("SLA"), connectivity details, usage data, call detail records, call statistics, network connectivity statistics, network configuration data, or other attributes from each network, and/or the like.

In some embodiments, the method might further comprise applying, with the computing system, weighting factors to predetermined categories of data among each of the first set of network information and the second set of network information. In such cases, generating the unified routing model for optimizing routing of the call between the calling party and the called party through the at least one first network and the at least one second network might comprise generating the unified routing model for optimizing routing of the call between the calling party and the called party through the at least one first network and the at least one second network based at least in part on the applied weighting factors to the predetermined categories of data among each of the first set of network information and the second set of network information. In some instances, the weighting factors might be based on at least one of key performance indicator ("KPI") data, data regarding health of network routes, capacity of network routes, quality of service ("QoS"), industry data, service level agreements ("SLA"), or private commercial exchange data, and/or the like.

Merely by way of example, in some cases, selecting the optimized route through the at least one first network and the at least one second network for establishing the call based on the generated unified routing model might comprise identifying, with the computing system, one or more direct routes through each of the at least one first network and the at least one second network between the originating point and the destination point; identifying, with the computing system, one or more indirect routes through each of the at least one first network and the at least one second network between the originating point and the destination point; identifying, with the computing system, one or more customers connected to each of the at least one first network and the at least one second network; analyzing, with the computing system, at least one of the identified one or more direct routes, the identified one or more indirect routes, or the identified one or more customers; and selecting, with the computing system, an optimized route through the at least one first network and the at least one second network for establishing the call based at least in part on the generated unified routing model and based at least in part on the analysis of the at least one of the identified one or more direct routes, the identified one or more indirect routes, or the identified one or more customers.

According to some embodiments, the method might further comprise normalizing, with the computing system, routing data to fit each subnetwork within each of the at least one first network and the at least one second network; and datafilling, with the computing system, each routing engine in each corresponding subnetwork within each of the at least one first network and the at least one second network with the normalized routing data. In such cases, establishing the call based on the selected optimized route might comprise sending, with the computing system, routing instructions to each routing engine in each corresponding subnetwork within each of the at least one first network and the at least one second network to route the call based on the normalized routing data.

In some embodiments, the method might further comprise receiving, with the computing system, a third set of network information from one or more third routing databases associated with at least one third network operated by a third service provider that is separate from each of the first service provider and the second service provider. In such cases, analyzing the received first set of network information and the received second set of network information to generate the unified routing model for optimizing routing of the call between the calling party and the called party might comprise analyzing, with the computing system, the received first set of network information, the received second set of network information, and the received third set of network information to generate a unified routing model for optimizing routing of the call between the calling party and the called party through the at least one first network, the at least one second network, and the at least one third network. Selecting the optimized route through the at least one first network and the at least one second network for establishing the call based at least in part on the generated unified routing model might comprise selecting, with the computing system, an optimized route through the at least one first network, the at least one second network, and the at least one third network for establishing the call based at least in part on the generated unified routing model. Establishing the call based at least in part on the selected optimized route might comprise establishing, with the computing system, the call through the at least one first network, the at least one second network, and the at least one third network based at least in part on the selected optimized route.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive, from a calling party at an originating point in at least one first network, a request to establish a call between the calling party and a called party at a destination point in at least one second network; receive a first set of network information from one or more first routing databases associated with the at least one first network that is operated by a first service provider; receive a second set of network information from one or more second routing databases associated with the at least one second network that is operated by a second service provider that is separate from the first service provider; analyze the received first set of network information and the received second set of network information to generate a unified routing model for optimizing routing of the call between the calling party and the called party through the at least one first network and the at least one second network; select an optimized route through the at least one first network and the at least one second network for establishing the call based at least in part on the generated unified routing model; and establish the call based at least in part on the selected optimized route.

In some embodiments, the apparatus might comprise at least one of a call server, a call controller, a call manager, a media gateway controller, centralized call server, a centralized call controller, a centralized call manager, or a centralized media gateway controller, and/or the like. In some cases, the at least one first network and the at least one second network might each comprise at least one of a circuit-switched network, a public switched telephone network, a voice over Internet protocol ("VoIP") network, a computer network, or the Internet, and/or the like. In some instances, the first set of network information and the second set of network information might each comprise at least one of private peering agreements, private commercial exchange data, traffic exchange agreements, cost data for traffic exchange, service level agreements, minimum contractually required traffic, maximum contractually required traffic, local exchange routing guide ("LERG") data, number portability, key performance indicator ("KPI") data, data regarding health of network routes, capacity of network routes, quality of service ("QoS"), industry data, service level agreements ("SLA"), connectivity details, usage data, call detail records, call statistics, network connectivity statistics, network configuration data, or other attributes from each network, and/or the like.

According to some embodiments, the set of instructions, when executed by the at least one processor, might further cause the apparatus to: apply weighting factors to predetermined categories of data among each of the first set of network information and the second set of network information. In such cases, generating the unified routing model for optimizing routing of the call between the calling party and the called party through the at least one first network and the at least one second network might comprise generating the unified routing model for optimizing routing of the call between the calling party and the called party through the at least one first network and the at least one second network based at least in part on the applied weighting factors to the predetermined categories of data among each of the first set of network information and the second set of network information. In some instances, the weighting factors might be based on at least one of key performance indicator ("KPI") data, data regarding health of network routes, capacity of network routes, quality of service ("QoS"), industry data, service level agreements ("SLA"), or private commercial exchange data, and/or the like.

In some embodiments, selecting the optimized route through the at least one first network and the at least one second network for establishing the call based on the generated unified routing model might comprise identifying one or more direct routes through each of the at least one first network and the at least one second network between the originating point and the destination point; identifying one or more indirect routes through each of the at least one first network and the at least one second network between the originating point and the destination point; identifying one or more customers connected to each of the at least one first network and the at least one second network; analyzing at least one of the identified one or more direct routes, the identified one or more indirect routes, or the identified one or more customers; and selecting an optimized route through the at least one first network and the at least one second network for establishing the call based at least in part on the generated unified routing model and based at least in part on the analysis of the at least one of the identified one or more direct routes, the identified one or more indirect routes, or the identified one or more customers.

According to some embodiments, the set of instructions, when executed by the at least one processor, might further cause the apparatus to: normalize routing data to fit each subnetwork within each of the at least one first network and the at least one second network; and datafill each routing engine in each corresponding subnetwork within each of the at least one first network and the at least one second network with the normalized routing data. In such cases, establishing the call based on the selected optimized route might comprise sending routing instructions to each routing engine in each corresponding subnetwork within each of the at least one first network and the at least one second network to route the call based on the normalized routing data.

In some embodiments, the set of instructions, when executed by the at least one processor, might further cause the apparatus to: receive a third set of network information from one or more third routing databases associated with at least one third network operated by a third service provider that is separate from each of the first service provider and the second service provider. In such cases, analyzing the received first set of network information and the received second set of network information to generate the unified routing model for optimizing routing of the call between the calling party and the called party might comprise analyzing the received first set of network information, the received second set of network information, and the received third set of network information to generate a unified routing model for optimizing routing of the call between the calling party and the called party through the at least one first network, the at least one second network, and the at least one third network. Selecting the optimized route through the at least one first network and the at least one second network for establishing the call based at least in part on the generated unified routing model might comprise selecting an optimized route through the at least one first network, the at least one second network, and the at least one third network for establishing the call based at least in part on the generated unified routing model. Establishing the call based at least in part on the selected optimized route might comprise establishing the call through the at least one first network, the at least one second network, and the at least one third network based at least in part on the selected optimized route.

In yet another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive, from a calling party at an originating point in at least one first network, a request to establish a call between the calling party and a called party at a destination point in at least one second network; receive a first set of network information from one or more first routing databases associated with the at least one first network that is operated by a first service provider; receive a second set of network information from one or more second routing databases associated with the at least one second network that is operated by a second service provider that is separate from the first service provider; analyze the received first set of network information and the received second set of network information to generate a unified routing model for optimizing routing of the call between the calling party and the called party through the at least one first network and the at least one second network; select an optimized route through the at least one first network and the at least one second network for establishing the call based at least in part on the generated unified routing model; and establish the call based at least in part on the selected optimized route.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing call or data routing, and, more particularly, to methods, systems, and apparatuses for implementing management of routing of voice or data across multiple voice or data networks with separate routing masters, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing management of routing of a call across multiple voice networks with separate routing masters, in accordance with various embodiments.

In the non-limiting embodiment of FIG. 1, system 100 might comprise a computing system(s) 105, a calling device 110 (which might include, without limitation, a telephone 110a, a smart phone 110b, a mobile phone 110c, or the like), a called device 115 (which might include, but is not limited to, a telephone 115a, a smart phone 115b, a mobile phone 115c, or the like), and a plurality of sets of networks 120 (which might include, without limitation, at least one first network 120a associated with and/or operated by a first service provider, at least one second network 120b associated with and/or operated by a second service provider that is separate or different from the first service provider, at least one third network 120c associated with and/or operated by a third service provider that is separate or different from each of the first service provider and the second service provider, through at least one $N^{th}$ network 120n associated with and/or operated by a $N^{th}$ service provider that is separate or different from each of the first service provider, the second service provider, and the third service provider, and/or the like.). Each of the plurality of sets of networks 120 might comprise at least one routing engine 125 and at least one routing database 130. For example, as shown in FIG. 1, the at least one first network 120a might comprise at least one first routing engine 125a and at least one first routing database 130a, while the at least one second network 120b might comprise at least one second routing engine 125b and at least one second routing database 130b, and the at least one third network 120c might comprise at least one third routing engine 125c and at least one third routing database 130c, and so on, through the at least one $N^{th}$ network 120n comprising at least one $N^{th}$ routing engine 125n and at least one $N^{th}$ routing database 130n, etc.

In some embodiments, the computing system(s) might include, without limitation, at least one of a call server, a call controller, a call manager, a media gateway controller, centralized call server, a centralized call controller, a centralized call manager, or a centralized media gateway controller, and/or the like. In some cases, the calling device 110 associated with a calling party and the called device 115 associated with a called party might each include, but is not limited to, at least one of a telephone, a voice over Internet protocol ("VoIP") private branch exchange ("PBX"), a time-division multiplexing ("TDM") voice PBX, a VoIP soft client, a facsimile machine, or a voice origination device, and/or the like.

According to some embodiments, the at least one first network 120a, the at least one second network 120b, the at least one third network 120c, through the at least one $N^{th}$ network 120n might each include, without limitation, at least one of a circuit-switched network, a public switched telephone network ("PSTN"), a VoIP network, a computer network, or the Internet. In some cases, the at least one first network 120a, the at least one second network 120b, the at least one third network 120c, through the at least one $N^{th}$ network 120n might each alternatively include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); an intranet; an extranet; an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 120 might include an access network and/or a core network of the corresponding service provider (e.g., an Internet service provider ("ISP")).

In operation, the computing system(s) 105 might receive, from the calling party at an originating point (via a first user device(s), e.g., calling device 110, or the like) in at least one first network (e.g., first network(s) 120a, or the like), a request to establish a call between the calling party and the called party at a destination point (via a second user device(s), e.g., called device 115, or the like) in at least one second network (e.g., second network(s) 120b, or the like). The computing system(s) 105 might receive a first set of network information from one or more first routing databases (e.g., routing database(s) 130a, or the like) associated with the at least one first network 120a that is operated by the first service provider; might receive a second set of network information from one or more second routing databases (e.g., routing database(s) 130b, or the like) associated with the at least one second network 120b that is operated by the second service provider that is separate from the first service provider; (optionally) might receive a third set of network information from one or more third routing databases (e.g., routing database(s) 130c, or the like) associated with at least one third network 120c operated by a third service provider that is separate from each of the first service provider and the second service provider; and so on until receiving an $N^{th}$ set of network information, where the computing system(s) might receive an $N^{th}$ set of network information from one or more $N^{th}$ routing databases (e.g., routing database(s) 130n, or the like) associated with at least one $N^{th}$ network 120n operated by an $N^{th}$ service provider that is separate from each of the first service provider, the second service provider, and the third service provider. The computing system(s) 105 might analyze the received network information (e.g., the received first set of network information, the received second set of network information, and (optionally or where applicable) one or more of the received third through $N^{th}$ set of network information, or the like) to generate a unified routing model for optimizing routing of the call between the calling party and the called party through the at least one first network and the at least one second network (and, optionally or where applicable, one or more of the at least one third network through the at least one $N^{th}$ network). The computing system(s) 105 might select an optimized route through the at least one first network and the at least one second network (and, optionally or where applicable, one or more of the at least one third network through the at least one $N^{th}$ network) for establishing the call based at least in part on the generated unified routing model; and might establish the call based at least in part on the selected optimized route.

Merely by way of example, in some instances, the first through $N^{th}$ sets of network information might each include, but is not limited to, at least one of private peering agreements, private commercial exchange data, traffic exchange agreements, cost data for traffic exchange, service level agreements, minimum contractually required traffic, maximum contractually required traffic, local exchange routing guide ("LERG") data, number portability, key performance indicator ("KPI") data, data regarding health of network routes, capacity of network routes, quality of service ("QoS"), industry data, service level agreements ("SLA"), connectivity details, usage data, call detail records, call statistics, network connectivity statistics, network configuration data, or other attributes from each network, and/or the like.

In some embodiments, the computing system(s) 105 might apply weighting factors to predetermined categories of data among each of the first set of network information and the second set of network information (and, optionally or where applicable, one or more of the at least one third through $N^{th}$ sets of network information, or the like). In such cases, generating the unified routing model for optimizing routing of the call between the calling party and the called party through the at least one first network and the at least one second network (and, optionally or where applicable, the one or more of the at least one third network through the at least one $N^{th}$ network) might comprise generating the unified routing model for optimizing routing of the call between the calling party and the called party through the at least one first network and the at least one second network (and, optionally or where applicable, the one or more of the at least one third network through the at least one $N^{th}$ network) based at least in part on the applied weighting factors to the predetermined categories of data among each of the first set of network information and the second set of network information (and, optionally or where applicable, the one or more of the at least one third through $N^{th}$ sets of network information, or the like). In some instances, the weighting factors might be based on at least one of KPI data, data regarding health of network routes, capacity of network routes, QoS, industry data, SLA, or private commercial exchange data, and/or the like.

According to some embodiments, the computing system(s) 105 might normalize routing data to fit each subnetwork within each of the at least one first network and the at least one second network (and, optionally or where applicable, the one or more of the at least one third network through the at least one $N^{th}$ network), and might datafill each routing engine in each corresponding subnetwork within each of the at least one first network and the at least one second network (and, optionally or where applicable, the one or more of the at least one third network through the at least one $N^{th}$ network) with the normalized routing data. In such cases, establishing the call based on the selected optimized route might comprise sending, with the computing system(s) 105, routing instructions to each routing engine (e.g., routing engine 125*a* and routing engine 125*b* (and, optionally or where applicable, corresponding one or more of routing engines 125*c*-125*n*, or the like) in each corresponding subnetwork within each of the at least one first network and the at least one second network (and, optionally or where applicable, the one or more of the at least one third network through the at least one $N^{th}$ network) to route the call based on the normalized routing data.

In some embodiments, selecting the optimized route through the at least one first network and the at least one second network (and, optionally or where applicable, the one or more of the at least one third network through the at least one $N^{th}$ network) for establishing the call based on the generated unified routing model comprise identifying, with the computing system(s) 105, one or more direct routes through each of the at least one first network and the at least one second network (and, optionally or where applicable, the one or more of the at least one third network through the at least one $N^{th}$ network) between the originating point and the destination point; identifying, with the computing system(s) 105, one or more indirect routes through each of the at least one first network and the at least one second network (and, optionally or where applicable, the one or more of the at least one third network through the at least one $N^{th}$ network) between the originating point and the destination point; identifying, with the computing system(s) 105, one or more customers connected to each of the at least one first network and the at least one second network (and, optionally or where applicable, the one or more of the at least one third network through the at least one $N^{th}$ network); analyzing, with the computing system(s) 105, at least one of the identified one or more direct routes, the identified one or more indirect routes, or the identified one or more customers; and selecting, with the computing system(s) 105, an optimized route through the at least one first network and the at least one second network (and, optionally or where applicable, the one or more of the at least one third network through the at least one $N^{th}$ network) for establishing the call based at least in part on the generated unified routing model and based at least in part on the analysis of the at least one of the identified one or more direct routes, the identified one or more indirect routes, or the identified one or more customers.

These and other functions of the system 100 (and its components) are described in greater detail below with respect to FIGS. 2-4.

Figure 2:
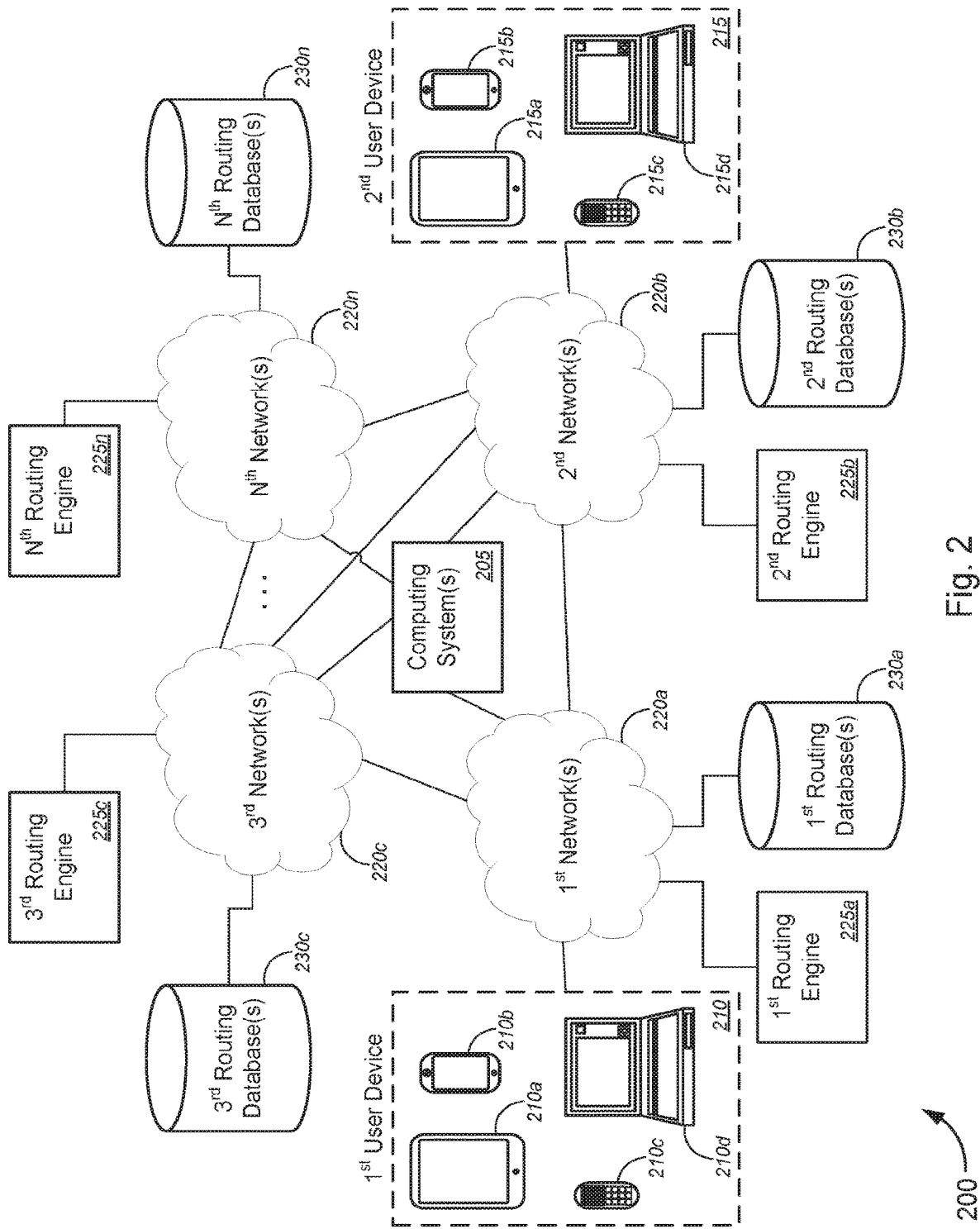
FIG. 2 is a schematic diagram illustrating another system for implementing management of routing of data across multiple data networks with separate routing masters, in accordance with various embodiments.

FIG. 2 is a schematic diagram illustrating another system 200 for implementing management of routing of data across multiple data networks with separate routing masters, in accordance with various embodiments.

In the non-limiting embodiment of FIG. 2, system 200 might comprise a computing system(s) 205, a first user device 210 (which might include, without limitation, a tablet computer 210*a*, a smart phone 210*b*, a mobile phone 210*c*, a laptop computer 210*d*, or the like), a second user device 215 (which might include, but is not limited to, a tablet computer 215*a*, a smart phone 215*b*, a mobile phone 215*c*, a laptop computer 215*d*, or the like), and a plurality of sets of networks 220 (which might include, without limitation, at least one first network 220*a* associated with and/or operated by a first service provider, at least one second network 220*b* associated with and/or operated by a second service provider that is separate or different from the first service provider, at least one third network 220*c* associated with and/or operated by a third service provider that is separate or different from each of the first service provider and the second service provider, through at least one $N^{th}$ network 220*n* associated with and/or operated by a $N^{th}$ service provider that is separate or different from each of the first service provider, the second service provider, and the third service provider, and/or the like.). Each of the plurality of sets of networks 220 might comprise at least one routing engine 225 and at least one routing database 230. For example, as shown in FIG. 2, the at least one first network 220*a* might comprise at least one first routing engine 225*a* and at least one first routing database 230*a*, while the at least one second network 220*b* might comprise at least one second routing engine 225*b* and at least one second routing database 230*b*, and the at least one third network 220*c* might comprise at least one third routing engine 225*c* and at least one third routing database 230c, and so on, through the at least one $N^{th}$ network 220n comprising at least one $N^{th}$ routing engine 225n and at least one $N^{th}$ routing database 230n, etc.

According to some embodiments, the at least one first network 220a, the at least one second network 220b, the at least one third network 220c, through the at least one $N^{th}$ network 220n might each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

In operation, the computing system(s) 205 might receive, from a first user at an originating point (via a first user device(s), e.g., first user device(s) 210, or the like) in at least one first network (e.g., first network(s) 220a, or the like), a request to establish a connection between the first user and a second user at a destination point (via a second user device(s), e.g., second user device(s) 215, or the like) in at least one second network (e.g., second network(s) 220b, or the like) to facilitate transmission and reception of data between the first user device(s) 210 and the second user device(s) 215. The computing system(s) 205 might receive a first set of network information from one or more first routing databases (e.g., routing database(s) 230a, or the like) associated with the at least one first network 220a that is operated by the first service provider; might receive a second set of network information from one or more second routing databases (e.g., routing database(s) 230b, or the like) associated with the at least one second network 220b that is operated by the second service provider that is separate from the first service provider; (optionally) might receive a third set of network information from one or more third routing databases (e.g., routing database(s) 230c, or the like) associated with at least one third network 220c operated by a third service provider that is separate from each of the first service provider and the second service provider; and so on until receiving an $N^{th}$ set of network information, where the computing system(s) might receive an $N^{th}$ set of network information from one or more $N^{th}$ routing databases (e.g., routing database(s) 230n, or the like) associated with at least one $N^{th}$ network 220n operated by an $N^{th}$ service provider that is separate from each of the first service provider, the second service provider, and the third service provider. The computing system(s) 205 might analyze the received network information (e.g., the received first set of network information, the received second set of network information, and (optionally or where applicable) one or more of the received third through $N^{th}$ set of network information, or the like) to generate a unified routing model for optimizing routing of the data between the first user device and the second user device through the at least one first network and the at least one second network (and, optionally or where applicable, one or more of the at least one third network through the at least one $N^{th}$ network). The computing system(s) 205 might select an optimized route between the first user device and the second user device through the at least one first network and the at least one second network (and, optionally or where applicable, one or more of the at least one third network through the at least one $N^{th}$ network) for establishing the connection, and/or facilitating routing of data, between the first user device and the second user device, based at least in part on the generated unified routing model; and might establish the connection, and/or facilitating routing of data, between the first user device and the second user device through the at least one first network and the at least one second network (and, optionally or where applicable, one or more of the at least one third network through the at least one $N^{th}$ network), based at least in part on the selected optimized route.

Merely by way of example, in some instances, the first through $N^{th}$ sets of network information might each include, but is not limited to, at least one of private peering agreements, private commercial exchange data, traffic exchange agreements, cost data for traffic exchange, service level agreements, minimum contractually required traffic, maximum contractually required traffic, local exchange routing guide ("LERG") data, number portability, user identification portability, key performance indicator ("KPI") data, data regarding health of network routes, capacity of network routes, quality of service ("QoS"), industry data, service level agreements ("SLA"), connectivity details, usage data, call detail records, call statistics, data transmission logs, network connectivity statistics, network configuration data, or other attributes from each network, and/or the like.

In some embodiments, the computing system(s) 205 might apply weighting factors to predetermined categories of data among each of the first set of network information and the second set of network information (and, optionally or where applicable, one or more of the at least one third through $N^{th}$ sets of network information, or the like). In such cases, generating the unified routing model for optimizing routing of the data between the first user device and the second user device through the at least one first network and the at least one second network (and, optionally or where applicable, the one or more of the at least one third network through the at least one $N^{th}$ network) might comprise generating the unified routing model for optimizing routing of the data between the first user device and the second user device through the at least one first network and the at least one second network (and, optionally or where applicable, the one or more of the at least one third network through the at least one $N^{th}$ network) based at least in part on the applied weighting factors to the predetermined categories of data among each of the first set of network information and the second set of network information (and, optionally or where applicable, the one or more of the at least one third through $N^{th}$ sets of network information, or the like). In some instances, the weighting factors might be based on at least one of KPI data, data regarding health of network routes, capacity of network routes, QoS, industry data, SLA, or private commercial exchange data, and/or the like.

According to some embodiments, the computing system(s) 205 might normalize routing data to fit each subnetwork within each of the at least one first network and the at least one second network (and, optionally or where applicable, the one or more of the at least one third network through the at least one $N^{th}$ network), and might datafill each routing engine in each corresponding subnetwork within each of the at least one first network and the at least one second network (and, optionally or where applicable, the one or more of the at least one third network through the at least one $N^{th}$ network) with the normalized routing data. In such cases, establishing the connection, and/or facilitating routing of data, between the first user device and the second user device through the at least one first network and the at least one second network (and, optionally or where applicable, one or more of the at least one third network through the at least one $N^{th}$ network) based on the selected optimized route might comprise sending, with the computing system(s) 205, routing instructions to each routing engine (e.g., routing engine 225a and routing engine 225b (and, optionally or where applicable, corresponding one or more of routing engines 225c-225n, or the like) in each corresponding sub-network within each of the at least one first network and the at least one second network (and, optionally or where applicable, the one or more of the at least one third network through the at least one $N^{th}$ network) to route the data based on the normalized routing data.

In some embodiments, selecting the optimized route through the at least one first network and the at least one second network (and, optionally or where applicable, the one or more of the at least one third network through the at least one $N^{th}$ network) for establishing the connection, and/or facilitating routing of data, between the first user device and the second user device based on the generated unified routing model comprise identifying, with the computing system(s) 205, one or more direct routes through each of the at least one first network and the at least one second network (and, optionally or where applicable, the one or more of the at least one third network through the at least one $N^{th}$ network) between the originating point and the destination point; identifying, with the computing system(s) 205, one or more indirect routes through each of the at least one first network and the at least one second network (and, optionally or where applicable, the one or more of the at least one third network through the at least one $N^{th}$ network) between the originating point and the destination point; identifying, with the computing system(s) 205, one or more customers connected to each of the at least one first network and the at least one second network (and, optionally or where applicable, the one or more of the at least one third network through the at least one $N^{th}$ network); analyzing, with the computing system(s) 205, at least one of the identified one or more direct routes, the identified one or more indirect routes, or the identified one or more customers; and selecting, with the computing system(s) 205, an optimized route through the at least one first network and the at least one second network (and, optionally or where applicable, the one or more of the at least one third network through the at least one $N^{th}$ network) for establishing the connection, and/or facilitating routing of data, between the first user device and the second user device based at least in part on the generated unified routing model and based at least in part on the analysis of the at least one of the identified one or more direct routes, the identified one or more indirect routes, or the identified one or more customers.

The computing system(s) 205, the first user device 210, the second user device 215, the plurality of sets of networks 220a-220n, the first through $N^{th}$ routing engines 225a-225n, and the first through $N^{th}$ routing databases 230a-230n of system 200 of FIG. 2 are otherwise similar, if not identical, to the computing system(s) 105, the calling device 110, the called device 115, the plurality of sets of networks 120a-120n, the first through $N^{th}$ routing engines 125a-125n, and the first through $N^{th}$ routing databases 130a-130n, respectively, of system 100 of FIG. 1, and the descriptions of these components of system 200 are applicable to the corresponding components of system 100, respectively.

Figure 3:
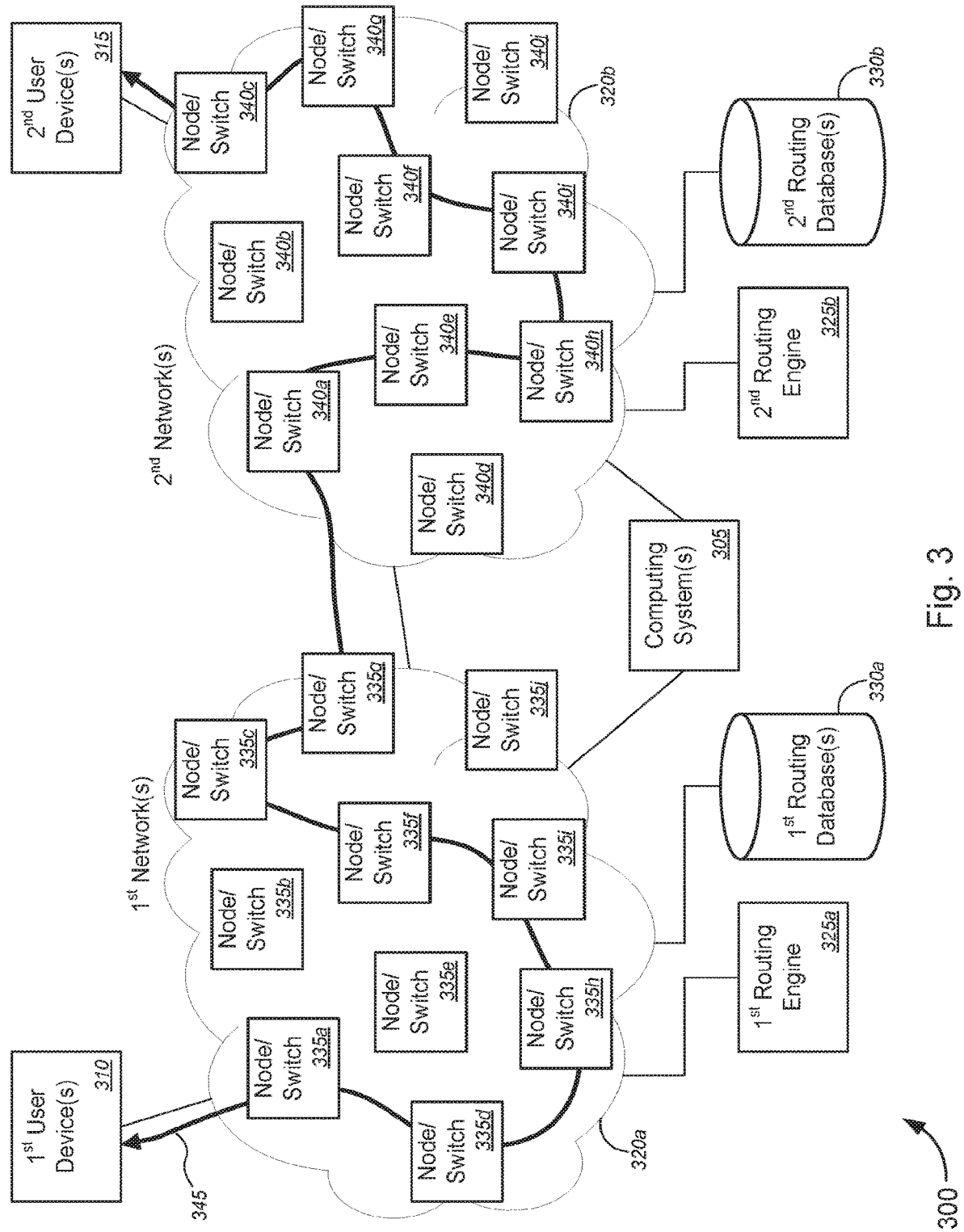
FIG. 3 is a schematic diagram illustrating yet another system for implementing management of routing of a call or data across multiple networks with separate routing masters, in accordance with various embodiments.

FIG. 3 is a schematic diagram illustrating yet another system 300 for implementing management of routing of a call or data across multiple networks with separate routing masters, in accordance with various embodiments.

In the non-limiting embodiment of FIG. 3, system 300 might comprise a computing system(s) 305, a first user device(s) 310, a second user device(s) 315, at least one first network 320a associated with and/or operated by a first service provider, at least one second network 320b associated with and/or operated by a second service provider that is separate or different from the first service provider, at least one first routing engine 325a and corresponding at least one first routing database 330a associated with the at least one first network 320a, at least one second routing engine 325b and corresponding at least one second routing database 330b associated with the at least one second network 320b, a plurality of first nodes or switches 335a-335j in the at least one first network 320a, and a plurality of second nodes or switches 340a-340j in the at least one second network 320b, and/or the like. Although two sets of networks 320a and 320b (each associated with and/or operated by different service providers) are shown in FIG. 3, the various embodiments are not so limited, and any suitable number of sets of networks 320 may be used. Although FIG. 3 depicts ten first nodes or switches 335a-335j in the at least one first network 320a, and although FIG. 3 depicts ten second nodes or switches 340a-340j in the at least one second network 320b, the various embodiments are not so limited, and any suitable number first and second nodes or switches 335 and 340 may be used as appropriate or as desired.

As a result of the operations as described herein with respect to FIGS. 1, 2, and 4, whether for implementing management of routing of a call across multiple voice networks with separate routing masters (as in FIGS. 1 and 4, or the like) or for management of routing of data across multiple data networks with separate routing masters implementing (as in FIG. 2, or the like), the first user device in the first network is connected with the second user device in a second network via a selected optimized route through the first network(s) and through the second network(s). Such an optimized route may be as shown in FIG. 3, which example includes a route (depicted by arrow 345) between the first user device(s) 310 in first network(s) 320a and the second user device(s) 315 in second network(s) 320b via first nodes or switches 335a, 335d, 335h, 335i, 335f, 335c, and 335g and via second nodes or switches 340a, 340e, 340h, 340i, 340f, 340g, and 340c.

These and other features and functions are described in greater detail with respect to FIGS. 1, 2, and 4.

The computing system(s) 305, the first user device 310, the second user device 315, the plurality of sets of networks 320a and 320b, the first and second routing engines 325a and 325b, and the first and second routing databases 330a and 330b of system 300 of FIG. 3 are otherwise similar, if not identical, to the computing system(s) 105, the calling device 110, the called device 115, the plurality of sets of networks 120a-120n, the first through $N^{th}$ routing engines 125a-125n, and the first through $N^{th}$ routing databases 130a-130n, respectively, of system 100 of FIG. 1, and the descriptions of these components of system 300 are applicable to the corresponding components of system 100, respectively. Similarly, the computing system(s) 305, the first user device 310, the second user device 315, the plurality of sets of networks 320a and 320b, the first and second routing engines 325a and 325b, and the first and second routing databases 330a and 330b of system 300 of FIG. 3 are otherwise similar, if not identical, to the computing system(s) 205, the first user device 210, the second user device 215, the plurality of sets of networks 220a-220n, the first through N$^{th}$ routing engines 225a-225n, and the first through N$^{th}$ routing databases 230a-230n, respectively, of system 200 of FIG. 2, and the descriptions of these components of system 300 are applicable to the corresponding components of system 200, respectively.

Figure 4A:
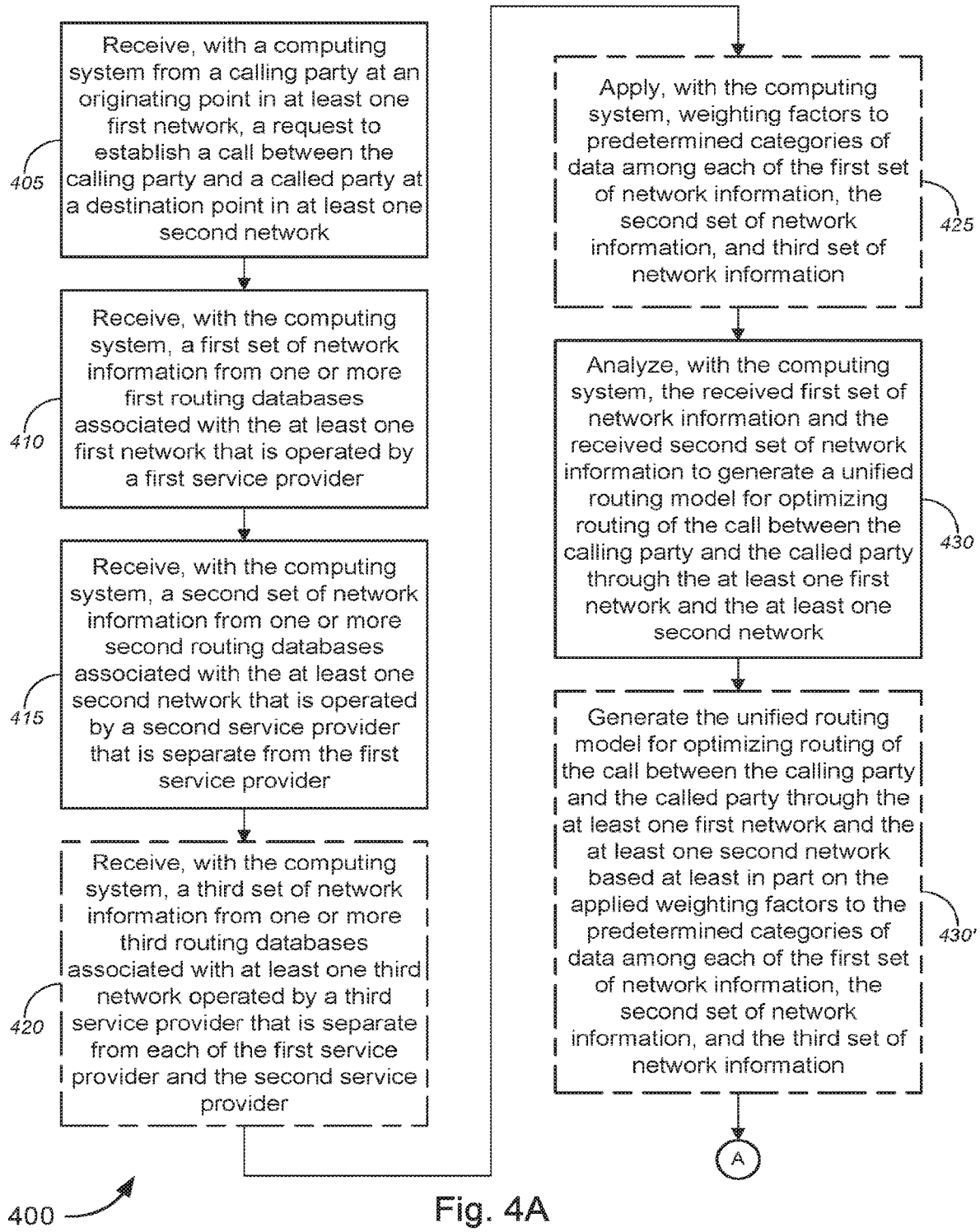
FIGS. 4A-4C are flow diagrams illustrating a method for implementing management of routing of a call across multiple networks with separate routing masters, in accordance with various embodiments.
Figure 4B:
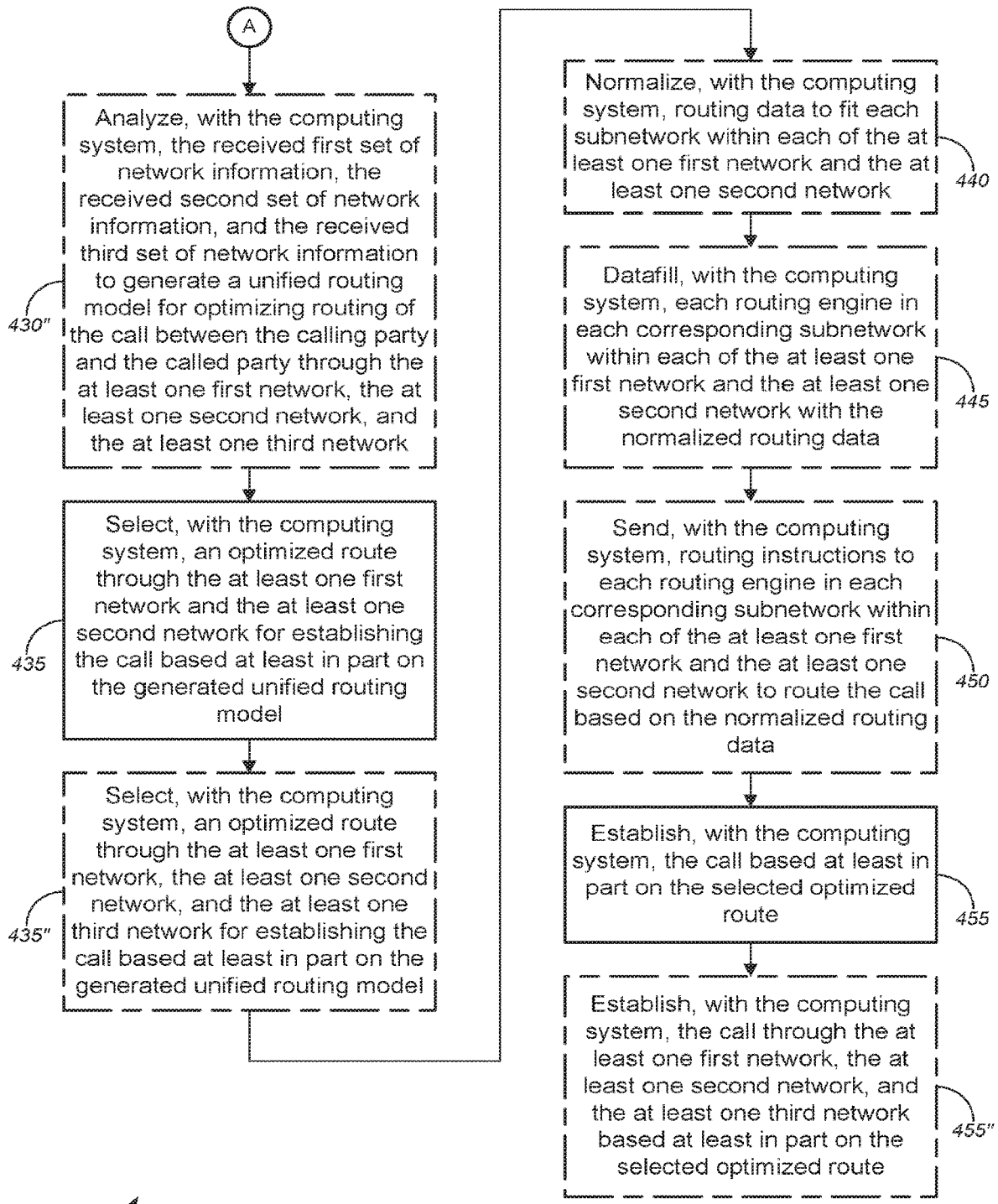
Figure 4C:
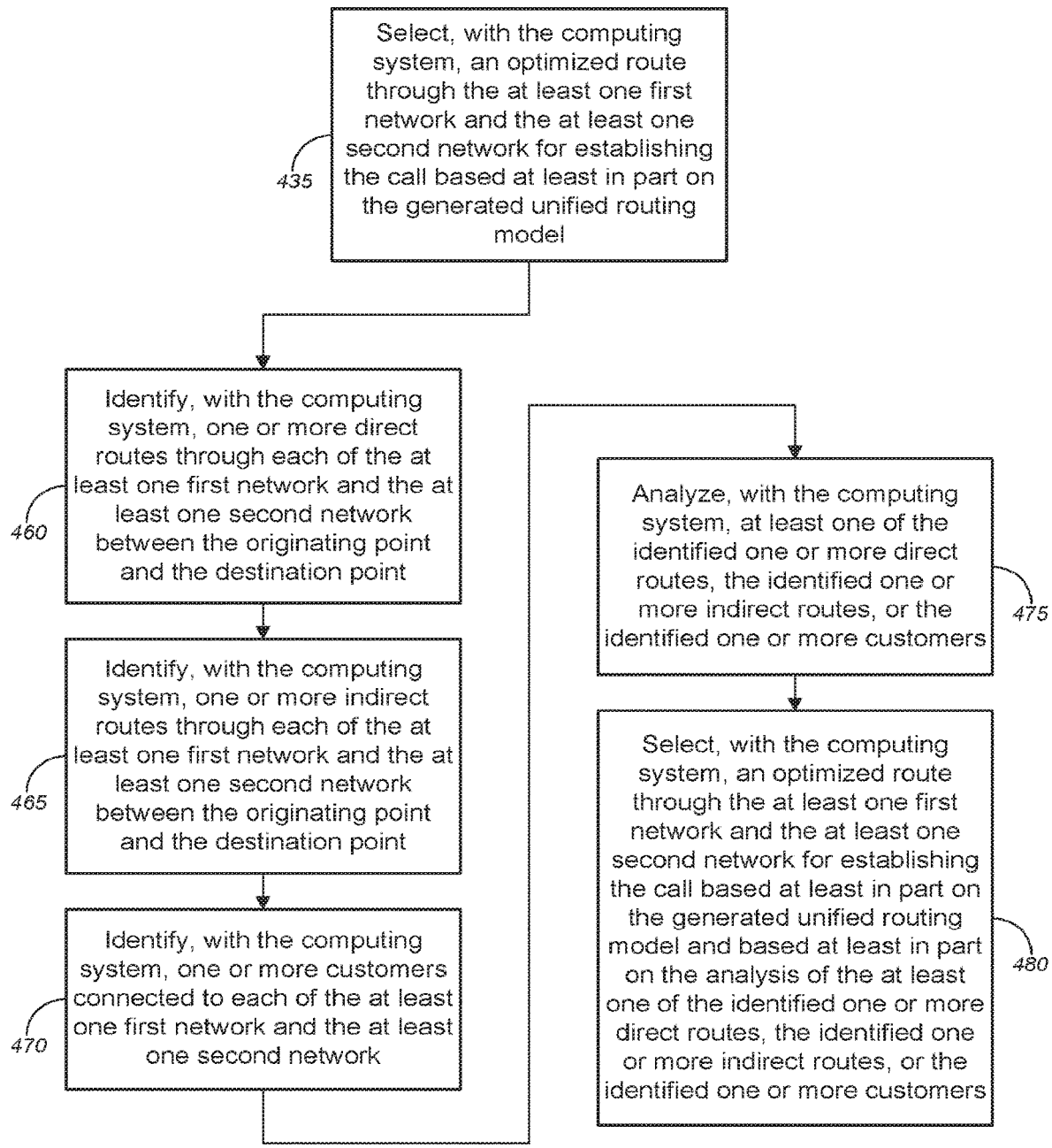

FIGS. 4A-4C (collectively, "FIG. 4") are flow diagrams illustrating a method 400 for implementing management of routing of a call across multiple networks with separate routing masters, in accordance with various embodiments. Method 400 of FIG. 4A continues onto FIG. 4B following the circular marker denoted, "A."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 300 of FIGS. 1, 2, and 3 can each also operate according to other modes of operation and/or perform other suitable procedures.

In the non-limiting embodiment of FIG. 4A, method 400, at block 405, might comprise receiving, with a computing system from a calling party at an originating point in at least one first network, a request to establish a call between the calling party and a called party at a destination point in at least one second network. In some embodiments, the computing system might include, without limitation, at least one of a call server, a call controller, a call manager, a media gateway controller, centralized call server, a centralized call controller, a centralized call manager, or a centralized media gateway controller, and/or the like. In some cases, the calling device associated with the calling party might include, but is not limited to, at least one of a telephone, a voice over Internet protocol ("VoIP") private branch exchange ("PBX"), a time-division multiplexing ("TDM") voice PBX, a VoIP soft client, a facsimile machine, or a voice origination device, and/or the like. Similarly, the called device associated with the called party might include, without limitation, at least one of a telephone, a VoIP PBX, a TDM voice PBX, a VoIP soft client, a facsimile machine, or a voice origination device, and/or the like.

Method 400 might further comprise receiving, with the computing system, a first set of network information from one or more first routing databases associated with the at least one first network that is operated by a first service provider (block 410); receiving, with the computing system, a second set of network information from one or more second routing databases associated with the at least one second network that is operated by a second service provider that is separate from the first service provider (block 415); and receiving, with the computing system, a third set of network information from one or more third routing databases associated with at least one third network operated by a third service provider that is separate from each of the first service provider and the second service provider (optional block 420).

In some instances, the first set of network information and the second set of network information (and optionally the third set of network information) might each include, without limitation, at least one of private peering agreements, private commercial exchange data, traffic exchange agreements, cost data for traffic exchange, service level agreements, minimum contractually required traffic, maximum contractually required traffic, local exchange routing guide ("LERG") data, number portability, key performance indicator ("KPI") data, data regarding health of network routes, capacity of network routes, quality of service ("QoS"), industry data, service level agreements ("SLA"), connectivity details, usage data, call detail records, call statistics, network connectivity statistics, network configuration data, or other attributes from each network, and/or the like. According to some embodiments, method 400 might further comprise, at optional block 425, applying, with the computing system, weighting factors to predetermined categories of data among each of the first set of network information and the second set of network information. In some cases, the weighting factors might be based on at least one of KPI data, data regarding health of network routes, capacity of network routes, QoS, industry data, SLA, or private commercial exchange data, and/or the like.

At block 430, method 400 might comprise analyzing, with the computing system, the received first set of network information and the received second set of network information to generate a unified routing model for optimizing routing of the call between the calling party and the called party through the at least one first network and the at least one second network. Alternatively, method 400, at optional block 430', might comprise generating the unified routing model for optimizing routing of the call between the calling party and the called party through the at least one first network and the at least one second network based at least in part on the applied weighting factors to the predetermined categories of data among each of the first set of network information and the second set of network information (and optionally the third set of network information). Method 400 might continue onto the process at optional block 430" in FIG. 4B following the circular marker denoted, "A."

At optional block 430" in FIG. 4B (following the circular marker denoted, "A"), method 400 might comprise analyzing, with the computing system, the received first set of network information, the received second set of network information, and the received third set of network information to generate a unified routing model for optimizing routing of the call between the calling party and the called party through the at least one first network, the at least one second network, and the at least one third network. At block 435, method 400 might comprise selecting, with the computing system, an optimized route through the at least one first network and the at least one second network for establishing the call based at least in part on the generated unified routing model. Alternatively, method 400 might comprise, at optional block 435", selecting, with the computing system, an optimized route through the at least one first network, the at least one second network, and the at least one third network for establishing the call based at least in part on the generated unified routing model.

Method 400 might further comprise normalizing, with the computing system, routing data to fit each subnetwork within each of the at least one first network and the at least one second network (optional block 440); datafilling, with the computing system, each routing engine in each corresponding subnetwork within each of the at least one first network and the at least one second network with the normalized routing data (optional block 445); and sending, with the computing system, routing instructions to each routing engine in each corresponding subnetwork within each of the at least one first network and the at least one second network to route the call based on the normalized routing data (optional block 450).

At block 455, method 400 might comprise establishing, with the computing system, the call based at least in part on the selected optimized route. Alternatively, or additionally, method 400 might comprise establishing, with the computing system, the call through the at least one first network, the at least one second network, and the at least one third network based at least in part on the selected optimized route (optional block 455").

With reference to FIG. 4C, selecting the optimized route through the at least one first network and the at least one second network for establishing the call based on the generated unified routing model (at block 435) might comprise identifying, with the computing system, one or more direct routes through each of the at least one first network and the at least one second network between the originating point and the destination point (block 460); identifying, with the computing system, one or more indirect routes through each of the at least one first network and the at least one second network between the originating point and the destination point (block 465); identifying, with the computing system, one or more customers connected to each of the at least one first network and the at least one second network (block 470); analyzing, with the computing system, at least one of the identified one or more direct routes, the identified one or more indirect routes, or the identified one or more customers (block 475); and selecting, with the computing system, an optimized route through the at least one first network and the at least one second network for establishing the call based at least in part on the generated unified routing model and based at least in part on the analysis of the at least one of the identified one or more direct routes, the identified one or more indirect routes, or the identified one or more customers (block 480).

Although method 400 of FIG. 4 is directed to improved or optimized routing of calls across multiple data networks with separate routing masters, the various embodiments are not so limited, and the method 400 may likewise be directed to improved or optimized routing of data across multiple data networks with separate routing masters, in accordance with the embodiments described herein.

Exemplary System and Hardware Implementation

Figure 5:
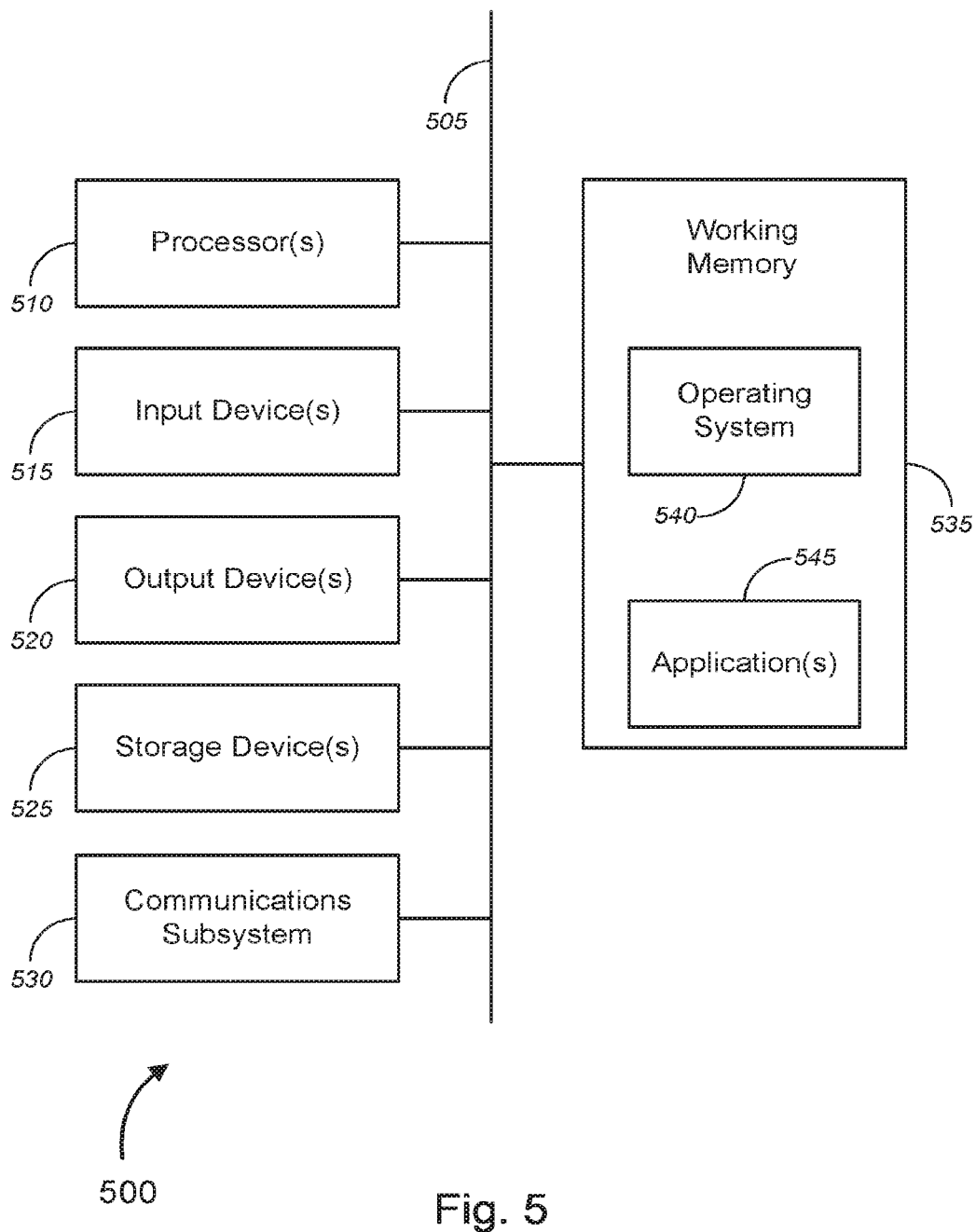
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems 105, 205, and 305, calling device 110, called device 115, routing engines 125a-125n, 225a-225n, and 325a-325n, first user devices 210 and 310, second user devices 215 and 315, and nodes/switches 335a-335j and 340a-340j, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems 105, 205, and 305, calling device 110, called device 115, routing engines 125a-125n, 225a-225n, and 325a-325n, first user devices 210 and 310, second user devices 215 and 315, and nodes/switches 335a-335j and 340a-340j, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
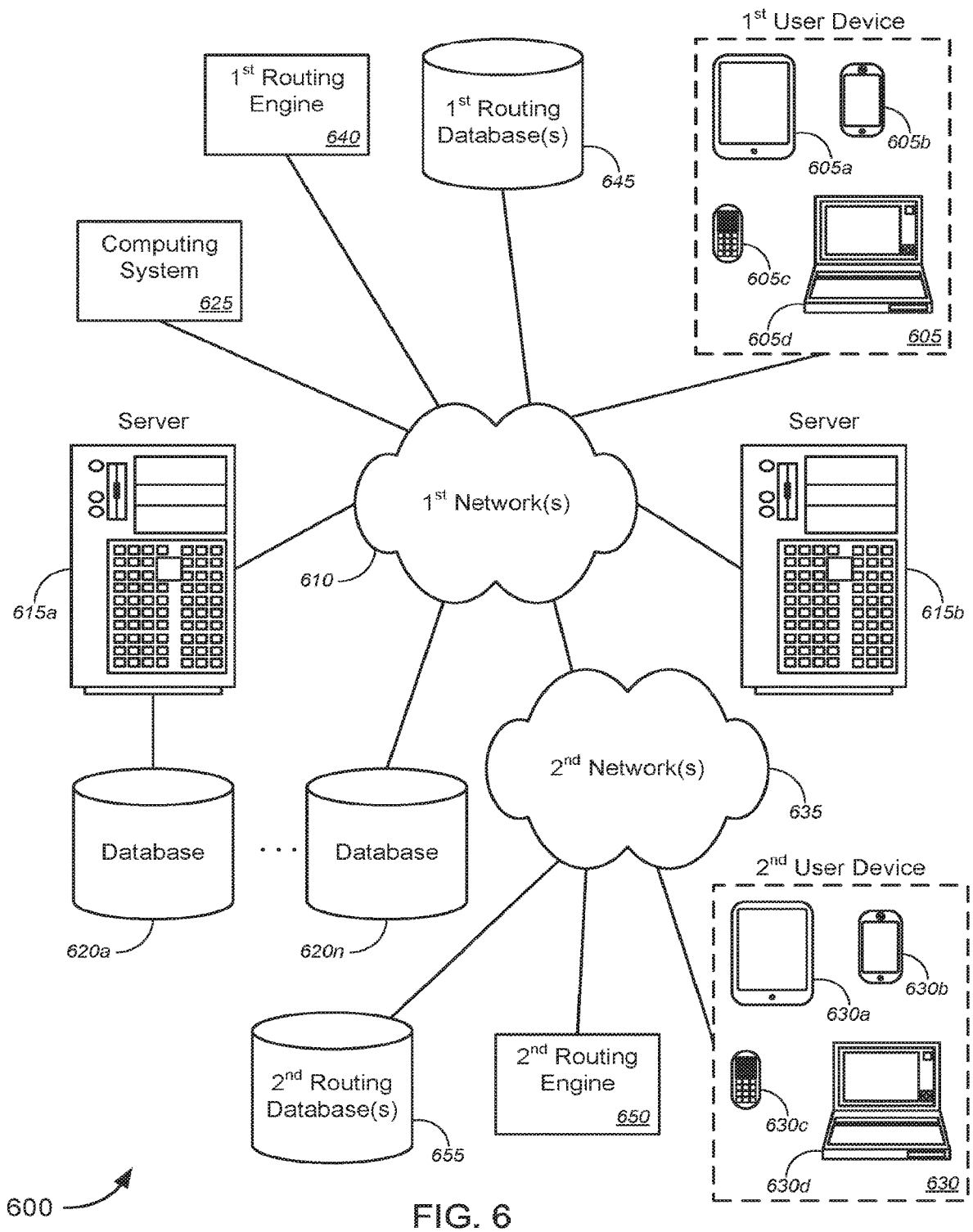
FIG. 6 is a block diagram illustrating a networked system of computers, computing systems, or system hardware architecture, which can be used in accordance with various embodiments.

As noted above, a set of embodiments comprises methods and systems for implementing call or data routing, and, more particularly, to methods, systems, and apparatuses for implementing management of routing of voice or data across multiple voice or data networks with separate routing masters. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with four user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 120a-120n, 220a-220n, 320a, and 320b of FIGS. 1-3, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing call or data routing, and, more particularly, to methods, systems, and apparatuses for implementing management of routing of voice or data across multiple voice or data networks with separate routing masters, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 (similar to computing systems 105, 205, and 305 of FIGS. 1-3, or the like), one or more second user devices 630 (similar to called device 115 or second user devices 215 and 315 of FIGS. 1-3, or the like), second network(s) 635 (similar to second network(s) 120b, 220b, and 320b of FIGS. 1-3, or the like), first routing engine 640 and corresponding first routing database(s) 645 (similar to first routing engines 125a, 225a, and 325a and corresponding first routing database(s) 130a, 230a, and 330a of FIGS. 1-3, or the like), and second routing engine 650 and corresponding second routing database(s) 655 (similar to second routing engines 125b, 225b, and 325b and corresponding second routing database(s) 130b, 230b, and 330b of FIGS. 1-3, or the like).

In some embodiments, the computing system might comprise at least one of a call server, a call controller, a call manager, a media gateway controller, centralized call server, a centralized call controller, a centralized call manager, or a centralized media gateway controller, and/or the like. According to some embodiments, the first set of network information and the second set of network information might each comprise at least one of private peering agreements, private commercial exchange data, traffic exchange agreements, cost data for traffic exchange, service level agreements, minimum contractually required traffic, maximum contractually required traffic, local exchange routing guide ("LERG") data, number portability, key performance indicator ("KPI") data, data regarding health of network routes, capacity of network routes, quality of service ("QoS"), industry data, service level agreements ("SLA"), connectivity details, usage data, call detail records, call statistics, network connectivity statistics, network configuration data, or other attributes from each network, and/or the like.

In operation, the computing system 625 might receive, from a calling party at an originating point (via a first user device(s), e.g., first user device(s) 605, or the like) in at least one first network (e.g., first network(s) 610, or the like), a request to establish a call between the calling party and a called party at a destination point (via a second user device(s), e.g., second user device(s) 630, or the like) in at least one second network (e.g., second network(s) 635, or the like). The computing system 625 might receive a first set of network information from one or more first routing databases associated with the at least one first network that is operated by a first service provider; might receive a second set of network information from one or more second routing databases associated with the at least one second network that is operated by a second service provider that is separate from the first service provider; and (optionally) might receive a third set of network information from one or more third routing databases associated with at least one third network (not shown in FIG. 6) operated by a third service provider that is separate from each of the first service provider and the second service provider. The computing system 625 might analyze the received network information (e.g., the received first set of network information, the received second set of network information, and (optionally) the received third set of network information, or the like) to generate a unified routing model for optimizing routing of the call between the calling party and the called party through the at least one first network and the at least one second network (and optionally the at least one third network). The computing system 625 might select an optimized route through the at least one first network and the at least one second network for establishing the call based at least in part on the generated unified routing model; and might establish the call based at least in part on the selected optimized route.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
receiving, with a computing system from a calling party at an originating point in at least one first network, a request to establish a call between the calling party and a called party at a destination point in at least one second network;
receiving, with the computing system, a first set of network information from one or more first routing databases associated with the at least one first network that is operated by a first service provider;
receiving, with the computing system, a second set of network information from one or more second routing databases associated with the at least one second network that is operated by a second service provider that is separate from the first service provider;
analyzing, with the computing system, the received first set of network information and the received second set of network information to generate a unified routing model for optimizing routing of the call between the calling party and the called party through the at least one first network and the at least one second network;
selecting, with the computing system, an optimized route through the at least one first network and the at least one second network for establishing the call based at least in part on the generated unified routing model;
establishing, with the computing system, the call based at least in part on the selected optimized route;
normalizing, with the computing system, routing data to fit each subnetwork within each of the at least one first network and the at least one second network; and datafilling, with the computing system, each routing engine in each corresponding subnetwork within each of the at least one first network and the at least one second network with the normalized routing data;

wherein establishing the call based on the selected optimized route comprises sending, with the computing system, routing instructions to each routing engine in each corresponding subnetwork within each of the at least one first network and the at least one second network to route the call based on the normalized routing data.

2. The method of claim 1, wherein the computing system comprises at least one of a call server, a call controller, a call manager, a media gateway controller, centralized call server, a centralized call controller, a centralized call manager, or a centralized media gateway controller.

3. The method of claim 1, wherein the calling device associated with the calling party comprises at least one of a telephone, a voice over Internet protocol ("VoIP") private branch exchange ("PBX"), a time-division multiplexing ("TDM") voice PBX, a VoIP soft client, a facsimile machine, or a voice origination device.

4. The method of claim 1, wherein the at least one first network and the at least one second network each comprises at least one of a circuit-switched network, a public switched telephone network, a voice over Internet protocol ("VoIP") network, a computer network, or the Internet.

5. The method of claim 1, wherein the first set of network information and the second set of network information each comprises at least one of private peering agreements, private commercial exchange data, traffic exchange agreements, cost data for traffic exchange, service level agreements, minimum contractually required traffic, maximum contractually required traffic, local exchange routing guide ("LERG") data, number portability, key performance indicator ("KPI") data, data regarding health of network routes, capacity of network routes, quality of service ("QoS"), industry data, service level agreements ("SLA"), connectivity details, usage data, call detail records, call statistics, network connectivity statistics, network configuration data, or other attributes from each network.

6. The method of claim 1, further comprising:
applying, with the computing system, weighting factors to predetermined categories of data among each of the first set of network information and the second set of network information;
wherein generating the unified routing model for optimizing routing of the call between the calling party and the called party through the at least one first network and the at least one second network comprises generating the unified routing model for optimizing routing of the call between the calling party and the called party through the at least one first network and the at least one second network based at least in part on the applied weighting factors to the predetermined categories of data among each of the first set of network information and the second set of network information.

7. The method of claim 6, wherein the weighting factors are based on at least one of key performance indicator ("KPI") data, data regarding health of network routes, capacity of network routes, quality of service ("QoS"), industry data, service level agreements ("SLA"), or private commercial exchange data.

8. The method of claim 1, wherein selecting the optimized route through the at least one first network and the at least one second network for establishing the call based on the generated unified routing model comprises:

identifying, with the computing system, one or more direct routes through each of the at least one first network and the at least one second network between the originating point and the destination point;
identifying, with the computing system, one or more indirect routes through each of the at least one first network and the at least one second network between the originating point and the destination point;
identifying, with the computing system, one or more customers connected to each of the at least one first network and the at least one second network;
analyzing, with the computing system, at least one of the identified one or more direct routes, the identified one or more indirect routes, or the identified one or more customers; and
selecting, with the computing system, an optimized route through the at least one first network and the at least one second network for establishing the call based at least in part on the generated unified routing model and based at least in part on the analysis of the at least one of the identified one or more direct routes, the identified one or more indirect routes, or the identified one or more customers.

9. The method of claim 1, further comprising:
receiving, with the computing system, a third set of network information from one or more third routing databases associated with at least one third network operated by a third service provider that is separate from each of the first service provider and the second service provider;
wherein analyzing the received first set of network information and the received second set of network information to generate the unified routing model for optimizing routing of the call between the calling party and the called party comprises analyzing, with the computing system, the received first set of network information, the received second set of network information, and the received third set of network information to generate a unified routing model for optimizing routing of the call between the calling party and the called party through the at least one first network, the at least one second network, and the at least one third network;
wherein selecting the optimized route through the at least one first network and the at least one second network for establishing the call based at least in part on the generated unified routing model comprises selecting, with the computing system, an optimized route through the at least one first network, the at least one second network, and the at least one third network for establishing the call based at least in part on the generated unified routing model; and
wherein establishing the call based at least in part on the selected optimized route comprises establishing, with the computing system, the call through the at least one first network, the at least one second network, and the at least one third network based at least in part on the selected optimized route.

10. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
receive, from a calling party at an originating point in at least one first network, a request to establish a call between the calling party and a called party at a destination point in at least one second network;

receive a first set of network information from one or more first routing databases associated with the at least one first network that is operated by a first service provider;

receive a second set of network information from one or more second routing databases associated with the at least one second network that is operated by a second service provider that is separate from the first service provider;

analyze the received first set of network information and the received second set of network information to generate a unified routing model for optimizing routing of the call between the calling party and the called party through the at least one first network and the at least one second network;

select an optimized route through the at least one first network and the at least one second network for establishing the call based at least in part on the generated unified routing model;

establish the call based at least in part on the selected optimized route;

normalize routing data to fit each subnetwork within each of the at least one first network and the at least one second network; and datafill each routing engine in each corresponding subnetwork within each of the at least one first network and the at least one second network with the normalized routing data;

wherein establishing the call based on the selected optimized route comprises sending routing instructions to each routing engine in each corresponding subnetwork within each of the at least one first network and the at least one second network to route the call based on the normalized routing data.

11. The apparatus of claim 10, wherein the apparatus comprises at least one of a call server, a call controller, a call manager, a media gateway controller, centralized call server, a centralized call controller, a centralized call manager, or a centralized media gateway controller.

12. The apparatus of claim 10, wherein the at least one first network and the at least one second network each comprises at least one of a circuit-switched network, a public switched telephone network, a voice over Internet protocol ("VoIP") network, a computer network, or the Internet.

13. The apparatus of claim 10, wherein the first set of network information and the second set of network information each comprises at least one of private peering agreements, private commercial exchange data, traffic exchange agreements, cost data for traffic exchange, service level agreements, minimum contractually required traffic, maximum contractually required traffic, local exchange routing guide ("LERG") data, number portability, key performance indicator ("KPI") data, data regarding health of network routes, capacity of network routes, quality of service ("QoS"), industry data, service level agreements ("SLA"), connectivity details, usage data, call detail records, call statistics, network connectivity statistics, network configuration data, or other attributes from each network.

14. The apparatus of claim 10, wherein the set of instructions, when executed by the at least one processor, further causes the apparatus to:

apply weighting factors to predetermined categories of data among each of the first set of network information and the second set of network information;

wherein generating the unified routing model for optimizing routing of the call between the calling party and the called party through the at least one first network and the at least one second network comprises generating the unified routing model for optimizing routing of the call between the calling party and the called party through the at least one first network and the at least one second network based at least in part on the applied weighting factors to the predetermined categories of data among each of the first set of network information and the second set of network information.

15. The apparatus of claim 14, wherein the weighting factors are based on at least one of key performance indicator ("KPI") data, data regarding health of network routes, capacity of network routes, quality of service ("QoS"), industry data, service level agreements ("SLA"), or private commercial exchange data.

16. The apparatus of claim 10, wherein selecting the optimized route through the at least one first network and the at least one second network for establishing the call based on the generated unified routing model comprises:

identifying one or more direct routes through each of the at least one first network and the at least one second network between the originating point and the destination point;

identifying one or more indirect routes through each of the at least one first network and the at least one second network between the originating point and the destination point;

identifying one or more customers connected to each of the at least one first network and the at least one second network;

analyzing at least one of the identified one or more direct routes, the identified one or more indirect routes, or the identified one or more customers; and selecting an optimized route through the at least one first network and the at least one second network for establishing the call based at least in part on the generated unified routing model and based at least in part on the analysis of the at least one of the identified one or more direct routes, the identified one or more indirect routes, or the identified one or more customers.

17. The apparatus of claim 10, wherein the set of instructions, when executed by the at least one processor, further causes the apparatus to:

receive a third set of network information from one or more third routing databases associated with at least one third network operated by a third service provider that is separate from each of the first service provider and the second service provider;

wherein analyzing the received first set of network information and the received second set of network information to generate the unified routing model for optimizing routing of the call between the calling party and the called party comprises analyzing the received first set of network information, the received second set of network information, and the received third set of network information to generate a unified routing model for optimizing routing of the call between the calling party and the called party through the at least one first network, the at least one second network, and the at least one third network;

wherein selecting the optimized route through the at least one first network and the at least one second network for establishing the call based at least in part on the generated unified routing model comprises selecting an optimized route through the at least one first network, the at least one second network, and the at least one third network for establishing the call based at least in part on the generated unified routing model; and wherein establishing the call based at least in part on the selected optimized route comprises establishing the call through the at least one first network, the at least one second network, and the at least one third network based at least in part on the selected optimized route.

18. A system, comprising:

a computing system, comprising:

at least one first processor; and a first non-transitory computer readable medium communicatively coupled to the at least one first processor, the first non-transitory computer readable medium having stored thereon computer software comprising a first set of instructions that, when executed by the at least one first processor, causes the computing system to:

receive, from a calling party at an originating point in at least one first network, a request to establish a call between the calling party and a called party at a destination point in at least one second network;

receive a first set of network information from one or more first routing databases associated with the at least one first network that is operated by a first service provider;

receive a second set of network information from one or more second routing databases associated with the at least one second network that is operated by a second service provider that is separate from the first service provider;

analyze the received first set of network information and the received second set of network information to generate a unified routing model for optimizing routing of the call between the calling party and the called party through the at least one first network and the at least one second network;

select an optimized route through the at least one first network and the at least one second network for establishing the call based at least in part on the generated unified routing model;

establish the call based at least in part on the selected optimized route;

normalize routing data to fit each subnetwork within each of the at least one first network and the at least one second network; and datafill each routing engine in each corresponding subnetwork within each of the at least one first network and the at least one second network with the normalized routing data;

wherein establishing the call based on the selected optimized route comprises sending routing instructions to each routing engine in each corresponding subnetwork within each of the at least one first network and the at least one second network to route the call based on the normalized routing data.

\* \* \* \* \*